UNITED STATES PATENT OFFICE 2,421,976

PROCESS FOR REACTING A KETENE WITH AN ALPHA, BETA UNSATURATED ALDEHYDE

Albert H. Agett, Kingsport, Tenn., assignor to Eastman Kodak Company, Rochester, N. Y., a corporation of New Jersey No Drawing. Application November 23, 1945, Serial No. 630,547

10 Claims. (Cl. 260—494)

This invention relates to a process for preparing a 1-acyloxydiene-1,3.

1-acetoxybutadiene-1,3 has been prepared by reacting crotonaldehyde with acetic anhydride, in the presence of a basic catalyst, such as anhydrous sodium acetate, for example.

I have now found that 1-acetoxybutadiene-1,3 can be prepared in good yields by condensing ketene with crotonaldehyde, in the presence of an acid catalyst. Still other 1-acyloxydienes-1,3 can be prepared using other unsaturated aldehydes, I have found.

It is, accordingly, an object of my invention to provide a new process for preparing 1-acyloxydienes-1,3. Other objects will become apparent hereinafter.

In accordance with my invention, I react a ketene with an unsaturated aldehyde of the following general formula:

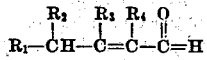

wherein $R_1$, $R_2$, $R_3$ and $R_4$ each represents a member selected from the group consisting of a hydrogen atom and an alkyl group, in the presence of an acid catalyst. Crotonaldehyde, with ketene ($CH_2=C=O$), gives 1-acetoxybutadiene-1,3; 2-penten-1-al gives 1-acetoxypentadiene-1,3; 2-hexen-1-al gives 1-acetoxyhexadiene-1,3; tiglic aldehyde gives 1-acetoxy-2-methylbutadiene-1,3; 3-ethylhexen-1-al gives 1-acetoxy-3-ethylhexadine-1,3, etc.

Ketene or substituted ketenes (aldoketenes and ketoketenes) can be employed in practicing my invention, e. g. simple ketene ($CH_2=C=O$), methylketene, dimethyl ketene, diethyl ketene, diphenyl ketene, etc. All of these substances are included under the term "a ketene."

Among the acid catalysts, those most advantageously employed in practicing my invention are represented by the following general formula:

$$X-SO_3H$$

wherein X represents a monovalent non-metallic atom other than hydrogen, e. g. fluorine, chlorine or bromine, or X represents a group of atoms containing at least one polyvalent non-metallic atom other than carbon, said polyvalent atom being linked directly to the S atom of the —$SO_3H$ group, e. g. HO—, $CH_3O$—, $C_2H_5O$—, $C_3H_7O$—, $C_4H_9O$—, $H_2N$—, $(CH_3)_2N$—, $CH_3COHN$—, etc. Included under the acid catalysts represented by the above general formula is oleum (e. g. sulfuric acid containing from 5 to 50 per cent by weight of sulfur trioxide). Still other acid catalysts can be used, e. g. phosphoric acid, p-toluenesulfonic acid, etc., but those represented by the above general formula are superior.

In preparing 1-acyloxydienes-1,3, in accordance with my invention, the unsaturated aldehyde is placed in a reaction vessel along with a small quantity of the acid catalyst. The mixture is then raised to reaction temperature and a ketene, preferably freshly prepared is added to the mixture at a rate which substantially precludes the building up in the reaction mixture of any substantial quantity of the unreacted ketene. The dispersion of the ketene in the reaction mixture is advantageously facilitated by agitation of the reaction mixture. Agitation also aids in avoiding local over-heating of the reaction mixture. The addition of the ketene is advantageously continued until a quantity has been added which is at least as much as the molecular equivalent quantity of the aldehyde present, or until no further reaction takes place.

The ketene employed in practicing my invention can be prepared in any suitable manner. A convenient method for preparing the simplest ketene ($CH_2=C=O$) is by pyrolysis of acetone, removing the small quantity of residual acetone by passing the resulting vapors through a series of cold traps before utilizing the ketene for reaction with the aldehyde. Ketene ($CH_2=C=O$) prepared by pyrolysis of acetic acid can also be employed.

The process of my invention takes place over a wide temperature range. Usually I have found that the reaction takes place between 0 and 80° C., although temperatures outside this range can be employed. The heat of reaction may require cooling of the reaction mixture to control the temperature within the desired range.

If desired a reaction medium which is inert to the aldehyde and the ketene, e. g. a saturated aliphatic hydrocarbon (hexane, heptane, etc.) or an aromatic hydrocarbon (benzene, toluene, etc.) can be employed if desired. However, a reaction medium is unnecessary in the case of most aldehydes which are liquid at the reaction temperature employed.

The following example will serve to illustrate further the manner of practicing my invention.

*Example.—1-Acetoxybutadiene-1,3*

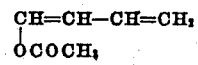

500 cc. of crotonaldehyde and 5 drops of sulfuric acid (sp. g. 1.84) were heated to 60 to 70°

C. while 2 gram-moles of ketene (CH$_2$=C=O) were passed into the mixture through a hollow high speed stirrer which also served to agitate the mixture. The mixture was then treated with anhydrous sodium acetate to neutralize the sulfuric acid. The neutralized mixture was distilled at 40 mm. of Hg pressure. In addition to diketene, a 36 per cent yield of 1-acetoxybutadiene-1,3 boiling at 58° C. was obtained. It had a refractive index (20/D) of 1.4570. At a temperature of ice water, 14 per cent of the crotonaldehyde was converted to 1-acetoxybutadiene-1,3 (46 per cent yield) and at 20° C., 8 per cent of the crotonaldehyde was converted to 1-acetoxybutadiene-1,3 (39 per cent yield).

In a similar manner, 2-penten-1-al gave 1-acetoxypentadiene-1,3; 2-hexen-1-al gave 1-acetoxyhexadiene-1,3 and tiglic aldehyde gave 1-acetoxy-2-methylbutadiene-1,3.

What I claim as my invention and desire to be secured by Letters Patent of the United States is:

1. A process for preparing a 1-acyloxydiene-1,3 comprising condensing a ketene with an unsaturated aldehyde of the following general formula:

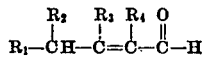

wherein R$_1$, R$_2$, R$_3$ and R$_4$ each represents a member selected from the group consisting of hydrogen and an alkyl group, in the presence of an acid catalyst.

2. A process for preparing 1-acetoxybutadiene-1,3 comprising condensing ketene with crotonaldehyde in the presence of an acid catalyst.

3. A process for preparing a 1-acyloxydiene-1,3 comprising condensing a ketene with an unsaturated aldehyde of the following general formula:

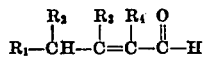

wherein R$_1$, R$_2$, R$_3$ and R$_4$ each represents a member selected from the group consisting of hydrogen and an alkyl group, in the presence of an acid catalyst selected from those represented by the following general formula:

wherein X represents a member selected from the group consisting of a monovalent non-metallic atom other than hydrogen and a group of atoms containing at least one polyvalent non-metallic atom other than carbon, said polyvalent non-metallic atom being linked directly to the S atom of the —SO$_3$H group.

4. A process for preparing a 1-acyloxydiene-1,3 comprising condensing a ketene with an unsaturated aldehyde of the following general formula:

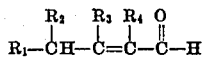

wherein R$_1$, R$_2$, R$_3$ and R$_4$ each represents a member selected from the group consisting of hydrogen and an alkyl group, in the presence of sulfuric acid.

5. A process for preparing a 1-acyloxydiene-1,3 comprising condensing a ketene with an unsaturated aldehyde of the following general formula:

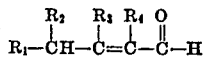

wherein R$_1$, R$_2$, R$_3$ and R$_4$ each represents a member selected from the group consisting of hydrogen and an alkyl group, in the presence of sulfamic acid.

6. A process for preparing a 1-acyloxydiene-1,3 comprising condensing a ketene with an unsaturated aldehyde of the following general formula:

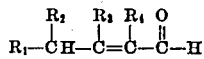

wherein R$_1$, R$_2$, R$_3$ and R$_4$ each represents a member selected from the group consisting of hydrogen and an alkyl group, in the presence of chlorosulfonic acid.

7. A process for preparing 1-acetoxybutadiene-1,3 comprising condensing ketene with crotonaldehyde, in the presence of an acid catalyst selected from those represented by the following general formula:

wherein X represents a member selected from the group consisting of a monovalent non-metallic atom other than hydrogen and a group of atoms containing at least one polyvalent non-metallic atom other than carbon, said polyvalent non-metallic atom being linked directly to the S atom of the —SO$_3$H group.

8. A process for preparing 1-acetoxybutadiene-1,3 comprising condensing ketene with crotonaldehyde, in the presence of sulfuric acid.

9. A process for preparing 1-acetoxybutadiene-1,3 comprising condensing ketene with crotonaldehyde, in the presence of sulfamic acid.

10. A process for preparing 1-acetoxybutadiene-1,3 comprising condensing ketene with crotonaldehyde, in the presence of chlorosulfonic acid.

ALBERT H. AGETT.

REFERENCES CITED

The following references are of record in the file of this patent:

UNITED STATES PATENTS

| Number | Name | Date |
|---|---|---|
| 2,021,698 | Perkins | Nov. 19, 1935 |
| 2,108,427 | Boese | Feb. 15, 1938 |
| 2,215,180 | Kaufler | Sept. 17, 1940 |
| 2,383,965 | Gwynn et al. | Sept. 4, 1945 |